United States Patent
Hsiao (10) Patent No.: US 10,097,361 B2
(45) Date of Patent: Oct. 9, 2018

(54) GAIN APPARATUS FOR POWER SOURCING EQUIPMENT OF POWER OVER ETHERNET

(71) Applicant: IC Plus Corp., Hsinchu (TW)

(72) Inventor: Chef Hsiao, Hsinchu (TW)

(73) Assignee: IC PLUS CORP., Hsinchu (TW)

( * ) Notice: Subject to any disclaimer, the term of this patent is extended or adjusted under 35 U.S.C. 154(b) by 273 days.

(21) Appl. No.: 14/981,358

(22) Filed: Dec. 28, 2015

(65) Prior Publication Data

US 2017/0104602 A1    Apr. 13, 2017

(30) Foreign Application Priority Data

Oct. 8, 2015   (TW) .............................. 104133322 A (51) Int. Cl.
*H04L 12/10*      (2006.01)

(52) U.S. Cl.
CPC .................... *H04L 12/10* (2013.01)

(58) Field of Classification Search
CPC ....................................................... H04L 12/10
USPC ............................................................ 307/1
See application file for complete search history.

(56) References Cited

U.S. PATENT DOCUMENTS

2009/0231033 A1* 9/2009 Yamada ................ H03F 1/0272
                                                  330/124 R

OTHER PUBLICATIONS

P.E. Allen, Lecture 390—Open-Loop Comparators (Reading: AH-461-475), ECE 6412—Analog Integrated Circuit Design—II, Georgia Institute of Technology, USA, 2002. pp. 1-12.

* cited by examiner

*Primary Examiner* — Thomas Skibinski
(74) *Attorney, Agent, or Firm* — Muncy, Geissler, Olds & Lowe, P.C.

(57) ABSTRACT

A gain circuit for power sourcing equipment of Power over Ethernet is disclosed and provides a guard band for the input offset voltages of its operational amplifier. The guard band may be represented by a voltage value and may be set to be greater than the maximum input offset voltage of the input terminals of the operational amplifier. In some embodiment, the guard band allows the voltage of the negative input terminal of the operational amplifier to be greater than 0 V without sacrificing the gain precision.

11 Claims, 7 Drawing Sheets

GAIN APPARATUS FOR POWER SOURCING EQUIPMENT OF POWER OVER ETHERNET

CROSS REFERENCE TO RELATED APPLICATIONS

This non-provisional application claims priority under 35 U.S.C. § 119(a) on Patent Application No(s). 104133322 flied in Taiwan, Republic of China on Oct. 8, 2015, the entire contents of which are hereby incorporated by reference.

BACKGROUND OF THE INVENTION

Field of Invention

The present invention relates generally to a gain circuit of power sourcing equipment, and more particularly to a gain circuit for power sourcing equipment of Power over Ethernet with high gain precision.

Related Art

Power over Ethernet (PoE) has found widespread application in many areas. For example, IEEE has released two standards that relate to PoE—IEEE 802.3af-2003 and IEEE 802.3at-2009. PoE technology allows supplying electric power through Ethernet to devices such as Internet phone, wireless base stations, network cameras, hubs, and even computers Without the need of extra power socket. Combining data transmission and power supply, PoE technology can reduce the cost and complexity of the overall network computing system.

Figure 1:
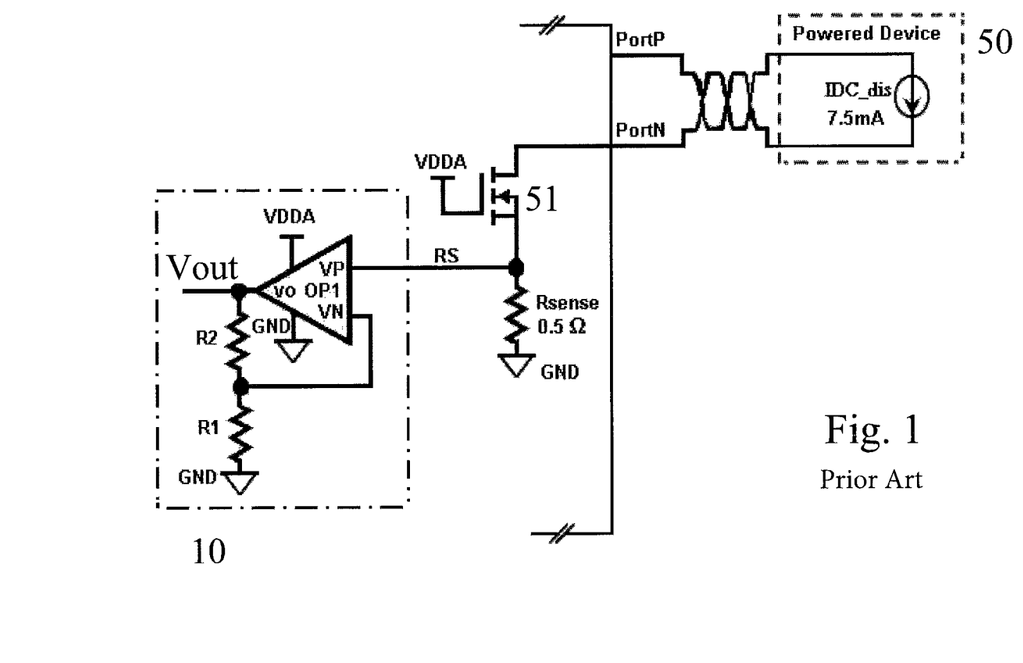
FIG. 1 shows a circuit diagram of a gain circuit for a power sourcing equipment of PoE.

FIG. 1 illustrates a circuit diagram of a gain circuit for a conventional power sourcing equipment of PoE. As shown, the gain circuit includes a power transistor 51 for providing a return current path for a powered device 50. For example, from the terminal PortP, 7.5 mA of the current IDC_dis may pass through the powered device 50, and to the terminal PortN. In FIG. 1, the output ports consist of the output signal on terminal PortP and return signal on terminal PortN. The return signal on terminal PortN is inputted through the power transistor 51, and converted into a voltage Vrs by the resistor Rsense. The voltage Vrs is then supplied to the positive terminal VP of the operational amplifier OP1 of the gain circuit 10.

The gain circuit 10 in FIG. 1 is adapted to receive the current from the powered device 50 and convert it into a voltage through the resistor Rsense. It then amplifies the voltage to provide a stable voltage Vout to electronic devices (not shown) connected to the PoE system. The gain circuit 10 in FIG. 1 includes the operational amplifier OP1, and resistors R1 and R2 connected in series and to the operational amplifier OP1. The positive terminal VP of the operational amplifier OP1 receives a voltage Vrs from the power transistor 51. The negative terminal VN of the operational amplifier OP1 is connected to the output terminal of the operational amplifier OP1 through the resistor R2. VDDA is a positive power source, and GND is ground, which operates as the negative power source.

The ideal gain function of the gain circuit 10 in FIG. 1 is represented as follows.

$$Vout=(Vrs)*(R2+R1)/R1$$

Figure 2:
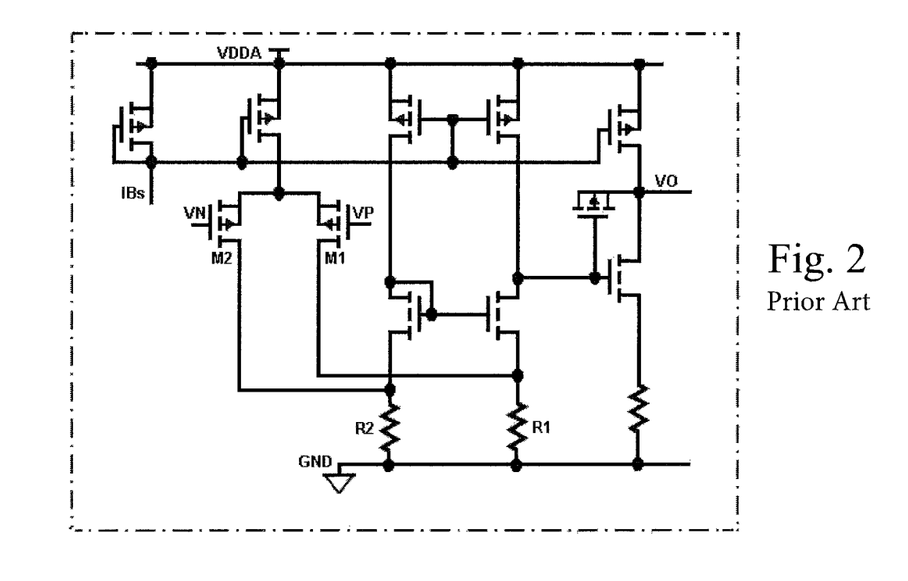
FIG. 2 shows a circuit diagram of the operational amplifier FIG. 1.

However, in a real operational amplifier, the gain function is not as ideal. FIG. 2 illustrates a circuit diagram of the operational amplifier OP1. As shown, the input transistors M1 and M2 may be a matching pair with the same dimensions (length and width). However, variations during the manufacturing process of the devices may result in device mismatches and cause an offset voltage Vos. Vos=VP-VN. This offset voltage between the positive terminal and the negative terminal of the operational amplifier OP1 is about ±(0~10 mV), and is an inherent, non-ideal characteristic of the operational amplifier.

In such a circumstance, the gain function of the operational amplifier OP1 is represented as below.

$$Vout=(Vrs+Vos)*(R2+R1)/R1$$

Vos is the input offset voltage, and it varies in accordance with the manufacturing process; thereby resulting in a nonlinear factor to the output voltage Vout and causing a poor precision of the voltage gain. In addition, under some conditions, the voltage gain deviation may be so great that it cannot be compensated. For example, when the current IDC_dis of the powered device 50 is 7.5 mA, the output voltage Vrs of the power transistor 51 will be:

$$Vrs=IDC\_dis*Rsense=7.5\ mA*0.5\Omega=3.75\ mV$$

If the deviation tolerance of the input offset voltage Vos is between 3.75 mV and 10 mV, since Vrs is just 3.75 mV, this may result in 100% error to the output voltage Vout of the gain circuit 10. This shows that the gain circuit in FIG. 1 is not suitable for the Power over Ethernet application.

Figure 3:
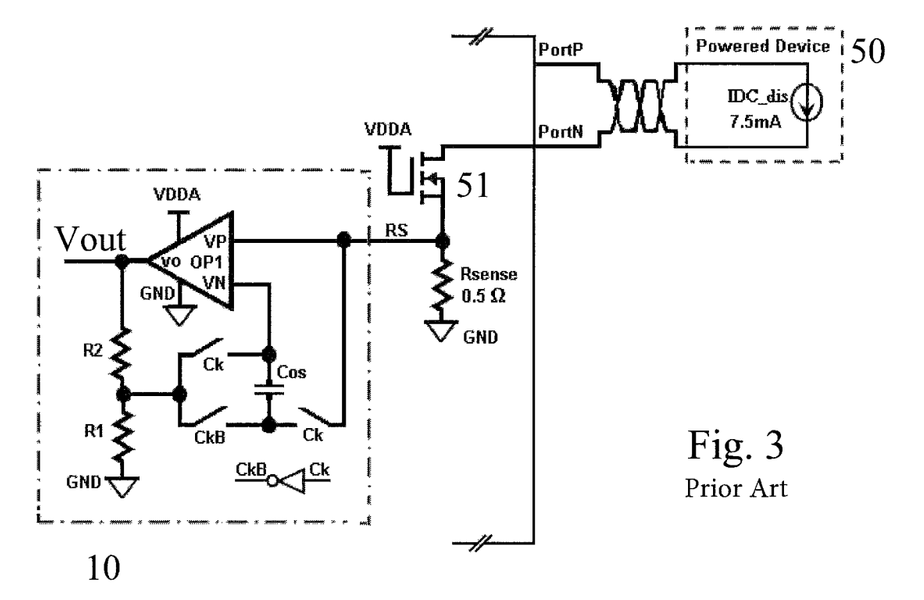
FIG. 3 shows a circuit diagram of another gain circuit for a power sourcing equipment of PoE.

FIG. 3 illustrates another circuit diagram of a gain circuit for a power sourcing equipment of PoE. The gain circuit in FIG. 3 improves on the one in FIG. 1 by trying to eliminate the input offset voltage Vos. FIG. 3 applies the same reference numerals to the elements as they are used in FIG. 1. The gain circuit of FIG. 3 may be referred to in P. E. Allen, Lecture 390—Open-Loop Comparators (Reading: AH-461-475), ECE 6412—Analog Integrated Circuit Design—II, Georgia Institute of Technology, USA, 2002.

Figure 4:
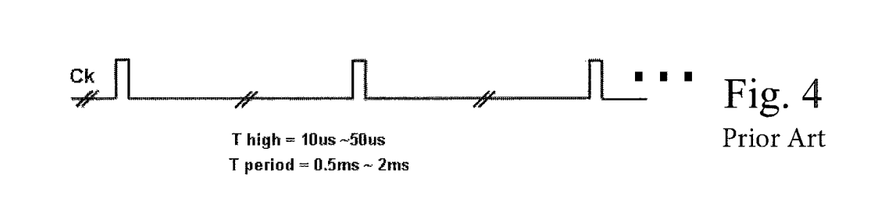
FIG. 4 shows a clock signal timing diagram of the circuit of FIG. 3.

The gain circuit 10 of FIG. 3 includes the operational amplifier OP1, and the resistors R1 and R2. It further includes a capacitor Cos and a clock circuit Ck. The capacitor Cos is connected between the negative terminal VN of the operational amplifier OP1 and the resistor R2. The connection status of the capacitor Cos with respect to the other elements is controlled by switches. FIG. 4 illustrates the clock signal of the clock circuit. When the clock signal is High, the Ck switches are closed and the CkB switch is opened. This causes the capacitor Cos to store the voltage Vos. When the clock signal is Low, the CkB switch is closed and the Ck switches are opened. This causes capacitor Cos to be connected to the resistor R2 in series.

In a real application, the input offset voltage. Vos is about ±(0~10 mV). The capacitor Cos can store the voltage Vcos when the clock signal is High. When the clock signal is Low, the stored voltage Vcos is deducted from (Vrs+Vos). In theory, the value of Vcos is equal to the input offset voltage Vos. Therefore, when the clock signal is Low, the input offset voltage Vos will not affect the gain factor. Specifically, the gain function of the operational amplifier OP1 can be represented as:

$$Vout=(Vrs+Vos-Vcos)*(R2+R1)/R1=Vrs*(R1+R2)/R1$$

Because Vos=Vcos, Vos is removed from the gain function, and this improves the gain accuracy. However, the gain circuit 10 may not be able to function properly when the current IDC_dis from the powered device 50 is 7.5 mA.

As previously explained, Vrs=IDC_dis*Rsense=7.5 mA*0.5Ω=3.75 mV. Therefore, when the clock signal is High, and assumes VN=−10 mV, the input offset voltage Vos should be:

$$Vos=VP-VN=3.75\ mV-(VN)=3.75\ mV-(-10\ mV)=13.75\ mV$$

However, because the negative terminal VN of the operational amplifier OP1 is connected to the ground via the resistor R1, the minimum voltage it can achieve is only 0V. The actual value of Vcos becomes:

Vcos=VP−VN=3.75 mV−(−0V)=3.75 mV

In other words, since the value of VN is limited to 0V, the maximum voltage stored in the capacitor Cos is capped at 3.75 mV, which may not be the actual value of the voltage Vos. Namely, when the value of Vos is between −3.75 mV and −10 mV, even if we are able to deduct the voltage Vcos stored in the capacitor Cos, the effect of the Vos to the output voltage Vout is still not eliminated. Moreover, when the input offset voltage Vos is less than −7.5 mV, the deviation of the gain can still be 100% and cannot be compensated accordingly. Thus, the gain circuit in FIG. 3 is also not suitable for Power over Ethernet applications.

Accordingly, there exists a need for a gain circuit with high gain precision for power sourcing equipment of Power over Ethernet, and with more tolerability towards manufacturing process. The present invention addresses these needs.

SUMMARY OF THE INVENTION

In some embodiments, the invention features a new gain circuit with high gain precision for power sourcing equipment of Power over Ethernet.

In another embodiment, the present invention features a new gain circuit for power sourcing equipment of Power over Ethernet to overcome deterioration of precision of the voltage gain due to the manufacturing process.

In yet another embodiment, the present invention provides a guard band for the operational amplifier. The guard hand can be represented by a voltage value. In one embodiment, the value is set to be greater than the maximum offset voltage of the operational amplifier, for example, by setting it to be twice the maximum offset voltage. In another embodiment, the setting of the guard band causes the voltage of the negative terminal of the operational amplifier to be greater than 0 V.

According to some embodiments of the present invention, the gain circuit includes an operational amplifier, a first resistor and a second resistor. The first resistor and the second resistor may be connected to an output terminal of the operational amplifier and a ground end in series. According to some embodiments, a first input terminal of the operational amplifier is connected to a voltage output of the power sourcing equipment of the Power over Ethernet equipment, and a second input terminal of the operational amplifier is connected to the output of the operational amplifier via the second resistor. In some embodiments, the gain circuit utilizes a clock signal to control whether the second input terminal is connected to the second resistor via a capacitor or not. In some embodiments, the gain circuit further includes a voltage adjusting circuit to set the voltage difference of the first input terminal and the second input terminal of the operational amplifier at a predetermined value. In some embodiments, the voltage adjusting circuit can provide a adjustment voltage to be greater than the maximum offset voltage between the first input terminal and the second input terminal. In some embodiments, the adjustment voltage may be twice the maximum offset voltage.

In some embodiments of the present invention, the voltage adjusting circuit is configured for adjusting the voltage of the second input terminal to be greater than 0 V. In another embodiment, the voltage adjusting circuit provides a positive voltage, which is greater than the absolute value of the maximum offset voltage between the first input terminal and the second input terminal, such as at twice the maximum value.

In some embodiments of the present invention, the voltage adjusting circuit includes a power source for providing a predetermined voltage to the second input terminal. In some embodiments, the predetermined voltage can adjust the voltage of the second input voltage to be greater than 0V. In another embodiment, the predetermined voltage has a positive value, and is greater than the absolute value of the maximum offset voltage between the first input terminal and the second input terminal, for example, by setting it to be twice the maximum offset voltage value In still another embodiment, the invention features a gain circuit of the power sourcing equipment of Power over Ethernet that may include a current reduction circuit for reducing the increased current due to the increase of voltage.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

A gain circuit of power sourcing equipment of Power over Ethernet of the present invention is provided to overcome poor precision of voltage gain of the gain circuit.

Figure 5:
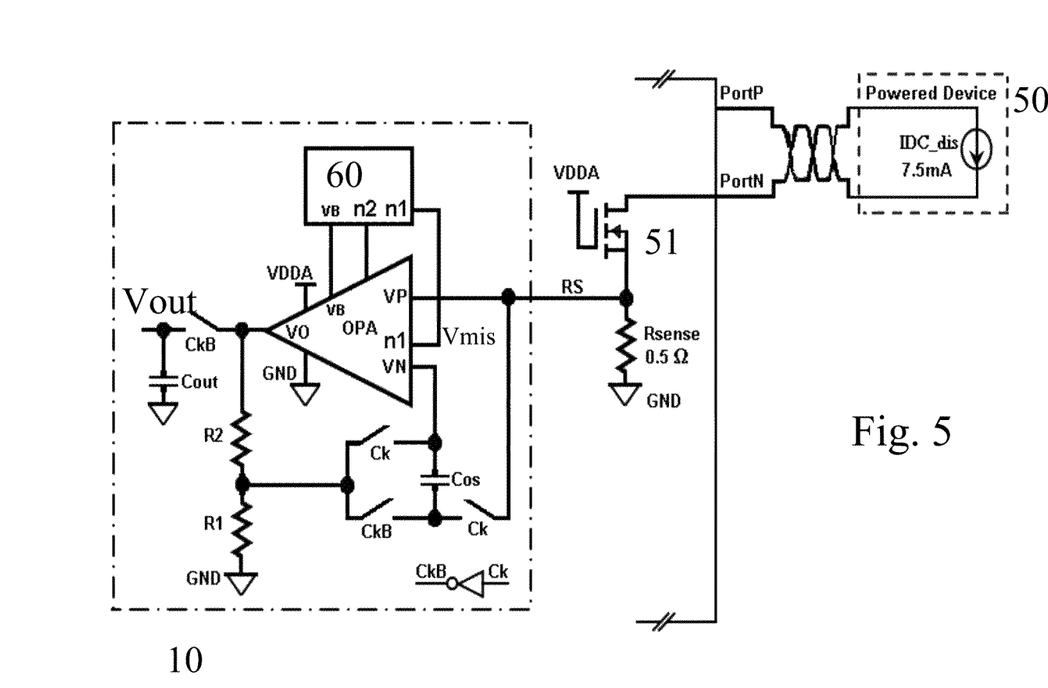
FIG. 5 shows a circuit diagram of a gain circuit of a power sourcing equipment of PoE in accordance with an embodiment of the present invention.

FIG. 5 shows a circuit diagram of a gain circuit of a power sourcing equipment of PoE in accordance with an embodiment of the present invention. In FIG. 5, the power sourcing equipment of PoE includes a powered device 50 that outputs current. For example, 7.5 mA of the current IDC_dis may be outputted by the power transistor 51 and converted into a voltage Vrs via a resistor Rsense. The voltage Vrs is then supplied to the positive terminal VP of the operational amplifier OPA of the gain circuit 10.

The gain circuit 10 in FIG. 5 is used to convert the output current from the powered device 50 to a voltage through the resister Rsense. The converted voltage is then amplified to provide a stable voltage Vout to electronic devices connected to the PoE system. In some embodiments, the gain circuit 10 includes the operational amplifier OPA, and the first resistor R1 and the second resistor R2 connected in series to the output terminal VO of the operational amplifier OPA and the ground GND. The power transistor 51 provides the voltage Vrs to the positive terminal VP of the operational amplifier OPA. The negative terminal VN of the operational amplifier OPA is connected to the output terminal VO of the operational amplifier OP1 via the second resistor R2. VDDA may be a positive power source, and GND may be a negative power source. In FIG. 5, GND is ground.

The gain circuit 10 may include a capacitor Cos and a clock circuit Ck. This capacitor Cos is connected between the negative terminal VN of the operational amplifier OPA and the second resistor R2. The connection status of the capacitor Cos is controlled by switches. The timing diagram of clock signal Ck may be the same as the one shown in FIG. 4. When the clock signal is High, the Ck switches are closed, and the CkB switch is opened. This causes the capacitor Cos to store the voltage Vos0. When the clock signal is Low, the CkB switch is closed and the Ck switches are opened. This causes capacitor Cos to be connected to the resistor R2 in series.

The voltage adjusting circuit 60 supplements a voltage Vmis to the negative terminal VN of the operational amplifier OPA for providing a guard band of the input offset voltage. In one embodiment, the guard band is set to be greater than the maximum offset voltage of the operational amplifier, for example, by setting it to be twice the maximum offset voltage. In another embodiment, the setting of the guard band causes the voltage of the negative terminal of the operational amplifier to be greater than 0 V.

In one embodiment of the present invention, the voltage adjusting circuit 60 provides a voltage Vmis such that the voltage of the negative terminal VN is greater than 0 V when the operational amplifier OPA is in its stable operational period. Thus, it can ensure that the voltage of the negative terminal VN is not limited by grounding.

In another embodiment, the voltage adjusting circuit 60 may provide a voltage Vmis greater than the maximum voltage difference Vmax between the positive terminal VP and the negative terminal VN. For example, Vmis may be set to be twice the Vmax. As previously described, without the voltage adjusting circuit 60, the input offset voltage Vos0 may be about ±(0~10 mV) due to the manufacturing process variation. Thus, the maximum voltage difference Vmax is 10 mV, and the voltage provided by the voltage adjusting circuit 60 is:

$$Vmis=2*Vmax=2*10\ mV=20\ mV$$

In such configuration, as explained below, the voltage of the negative terminal VN can be ensured to be greater than the voltage lower limit (0 V).

Assume the current IDC_dis of the power transistor 51 of the power sourcing equipment is 7.5 mA.

$$Vrs=IDC\_dis*Rsense=7.5\ mA*0.5\Omega=3.75\ mV$$

Assume that Vos0 is at its minimum, i.e., Vos0=Vmax=−10 mV. When the clock signal is High, $$VN=VP+Vos0+Vmis=3.75\ mV+(-10\ mV)+20\ mV=13.75\ mV$$

Thus, even in the worst case (Vos0=−10 mV), because of the added Vmis, VN can still be maintained to be greater than 13.75 mV, even though it is connected to ground. This will allow the gain circuit to achieve more accurate gain.

In the above configuration, because the voltage of the negative terminal VN will not be limited by the minimum voltage 0V, the voltage stored in the capacitor Cos can be equal to Vos0+Vmis. Even if the input offset voltage Vos0 is as low as to the range between −3.75 mV and −10 mV, the precision of the voltage gain of the gain circuit 10 can still be maintained, with the input offset voltage being able to be compensated. In some embodiments of the present invention, the operational amplifier OPA can thus provide a stable voltage to support power supplying chips with 8 ports.

In addition, when the value of Vos0 is between 3.75 mV and 10 mV, the capacitor Cos may still correctly store the associated voltage that is equal to Vos0+Vmis. The present invention can also be applied when the input offset voltage is in the range between 3.75 mV and 10 mV.

Figure 6:
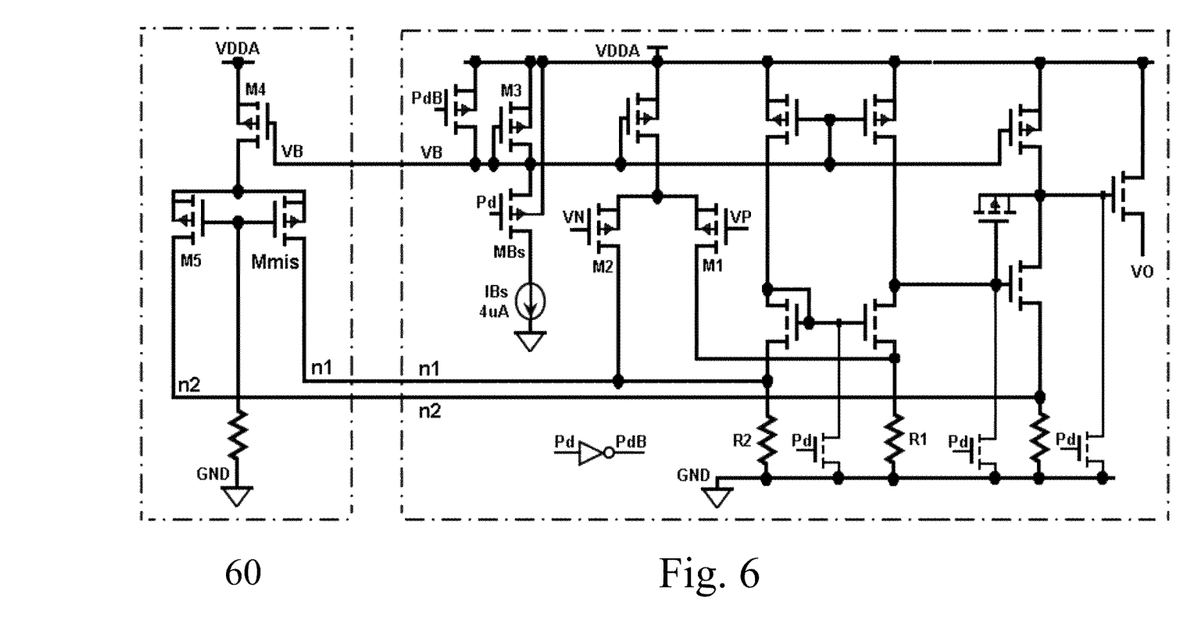
FIG. 6 shows a circuit diagram of the gain circuit in accordance with the embodiment of FIG. 5.

FIG. 6 shows a circuit diagram of an embodiment of the gain circuit in FIG. 5. As shown, the voltage adjusting circuit 60 is a power source Mmis. The power source Mmis supplements a voltage Vmis to the negative terminal VN of the operational amplifier OPA. Vmis=Id_Mmis*R2=20 mV. Therefore, when the operational amplifier OPA is in its stable operation, the increase in the voltage VN can be +20 mV.

In addition, the input signal Pd of the transistors in FIG. 6 is used for reducing the current of the operational amplifier OPA for power-saving. When Pd is High, the PdB will be Low, and MBs is OFF. And because Vgs is 0V, transistor M3 is OFF. This can achieve power-saving because now some current from the power source VDDA will not flow into the operational amplifier OPA and the voltage adjusting circuit 60.

Figure 7:
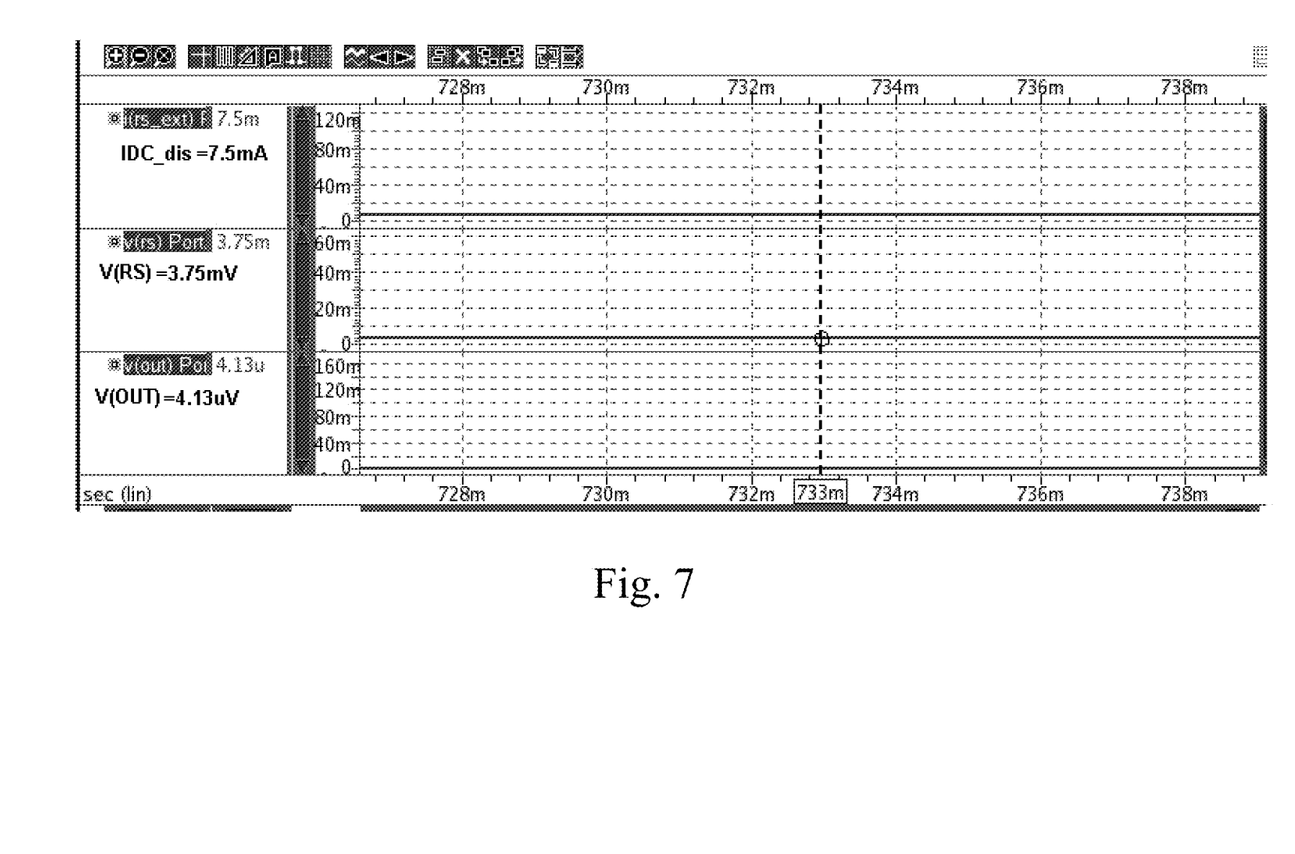
FIG. 7 shows a voltage gain simulation result of the gain circuit of FIG. 3.
Figure 8:
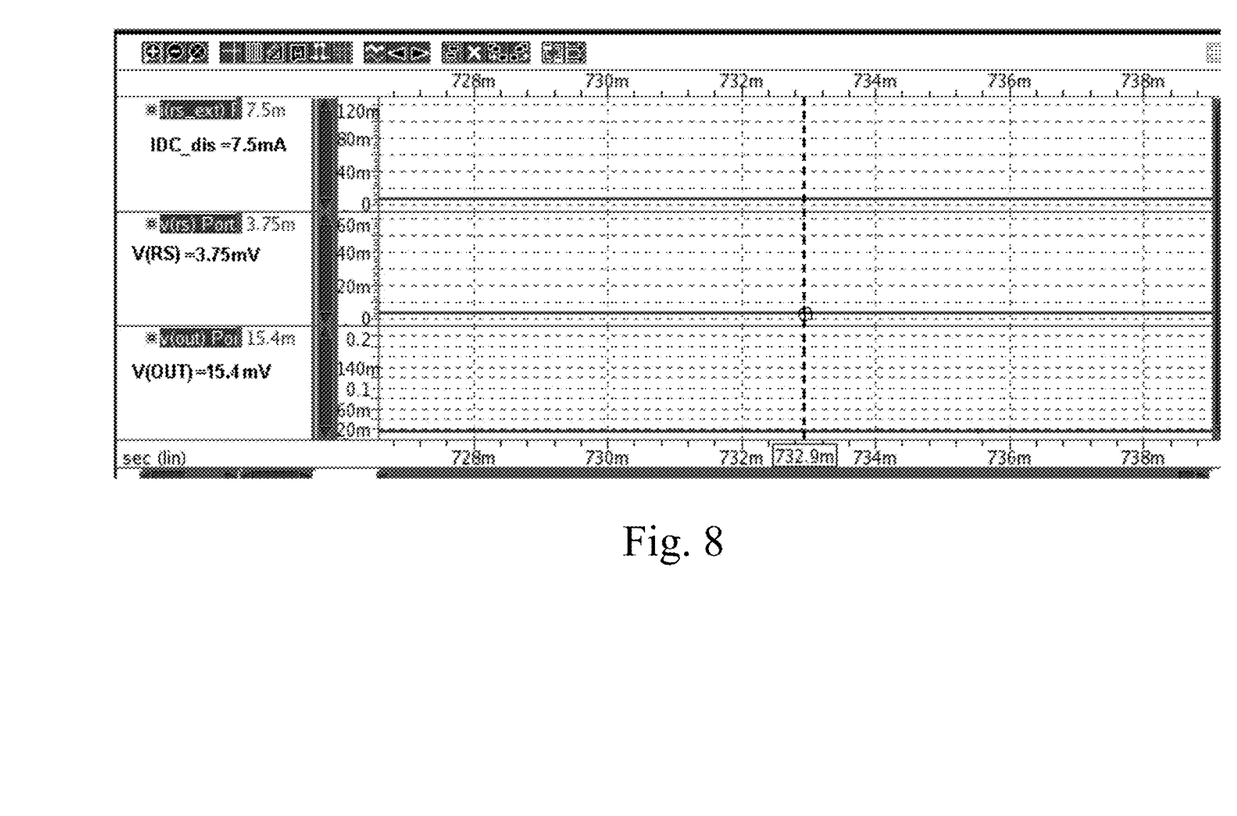
FIG. 8 shows a voltage gain simulation result of the gain circuit of FIG. 5.

To demonstrate the effect of the present invention, the simulation results for circuits in FIG. 3 and FIG. 5 are shown in FIG. 7 and FIG. 8 respectively.

FIG. 7 shows a voltage gain simulation result for the gain circuit 10 in FIG. 3. Simulation conditions are as below:

$$Vos=-10\ mV$$

$$Vrs=IDC\_dis*Rsense=7.5\ mA*0.5\Omega=3.75\ mV$$

$$(R1+R2/R1)=4$$

The clock signal is as shown in FIG. 4.
Test simulation result is as below $$Vout=4.13\ uV=0.00413\ mV,$$

Percentage error of voltage gain=[(0.00413 mV/15 mV)−1]*100%=−100%

Accordingly, the percentage error of voltage gain is −100%, which is the worst case.

FIG. 8 shows a voltage gain simulation result for the gain circuit 10 in FIG. 5. Simulation conditions are as below:

$$Vmis=20\ mV,$$

$$Vos0=-10\ mV,$$

$$Vrs=IDC\_dis*Rsense=7.5\ mA*0.5\Omega=3.75\ mV,$$

$$(R1+R2/R1)=4,$$

The clock signal is as shown in FIG. 4.
Test simulation result is as below.

$$Vout=15.4\ mV,$$

Percentage error of voltage gain=[(1-15.4 mV/15 mV)−1]*100%=+2.7%

This shows that the voltage gain is very precise.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall with true scope of the invention.

What is claimed is:

1. A gain circuit for power sourcing equipment adapted to supply power over Ethernet, comprising:
   a first resistor and a second resistor;
   an operational amplifier with a first input terminal, a second input terminal, and an output terminal, whereas (1) the first resistor and the second resistor are connected in series between the output terminal and a ground end, (2) the first input terminal is connected to a voltage output of the power sourcing equipment, and (3) the second input terminal is connected to the output terminal through the second resistor;
   a switch controller with a clock signal to control whether the second input terminal is connected to the second resistor through a capacitor; and
   a voltage adjusting circuit adapted to set voltage difference between the first input terminal and the second input terminal to a predetermined value.

2. The gain circuit of claim 1, wherein the predetermined value is twice a maximum input offset voltage between the first input terminal and the second input terminal.

3. The gain circuit of claim 1, wherein the voltage adjusting circuit comprises a power source adapted to supply an adjustment voltage to the second input terminal.

4. The gain circuit of claim 3, wherein the adjustment voltage has a positive value and is twice a maximum input offset voltage between the first input terminal and the second input terminal.

5. The gain circuit of claim 3, further comprising a current reducing circuit adapted to reduce an increased current due to an increased voltage.

6. The gain circuit of claim 1, further comprising a current reducing circuit adapted to reduce an increased current due to an increased voltage.

7. A gain circuit for power sourcing equipment adapted to supply Power over Ethernet, comprising:
   a first resistor and a second resistor;
   an operational amplifier with a first input terminal, a second input terminal, and an output terminal, whereas (1) the first resistor and the second resistor are connected in series between the output terminal and a ground end, (2) the first input terminal is connected to a voltage output of the power sourcing equipment, and (3) the second input terminal is connected to the output terminal through the second resistor;
   a switch controller with a clock signal to control whether the second input terminal is connected to the second resistor through a capacitor; and
   a voltage adjusting circuit adapted to supplement an adjustment voltage to an output of the second input terminal, whereas an absolute value of the adjustment voltage is greater than a maximum offset voltage between the first input terminal and the second input terminal.

8. The gain circuit of claim 7, wherein the adjustment voltage has a positive value and is twice a maximum input offset voltage between the first input terminal and the second input terminal.

9. A gain circuit for power sourcing equipment adapted to supply Power over Ethernet, comprising:
   a first resistor and a second resistor;
   an operational amplifier with a first input terminal, a second input terminal, and an output terminal, whereas (1) the first resistor and the second resistor are connected in series between the output terminal and a ground end, (2) the first input terminal is connected to a voltage output of the power sourcing equipment, and (3) the second input terminal is connected to the output terminal through the second resistor;
   a switch controller with a clock signal to control whether the second input terminal is connected to the second resistor through a capacitor; and
   a voltage adjusting circuit adapted to supplement an adjustment voltage to an output of the second input terminal, whereas the adjustment voltage is adapted to adjust a voltage of the second input terminal to be greater than 0V, so that an absolute value of the adjustment voltage becomes greater than a maximum offset voltage between the first input terminal and the second input terminal.

10. A gain circuit for power sourcing equipment adapted to supply Power over Ethernet, comprising:
    a first resistor and a second resistor;
    an operational amplifier with a first input terminal, a second input terminal, and an output terminal, whereas (1) the first resistor and the second resistor are connected in series between the output terminal and a ground end, (2) the first input terminal is connected to a voltage output of the power sourcing equipment, and (3) the second input terminal is connected to the output terminal through the second resistor;
    a switch controller with a clock signal to control whether the second input terminal is connected to the second resistor through a capacitor; and
    a voltage adjusting circuit adapted to supplement a positive voltage to an output of the second input terminal, whereas an absolute value of the positive voltage is greater than an absolute value of a maximum offset voltage between the first input terminal and the second input terminal.

11. The gain circuit of claim 10, wherein the positive voltage is twice a maximum input offset voltage between the first input terminal and the second input terminal.

* * * * *